United States Patent [19]
Sorensen et al.

[11] Patent Number: 5,924,171
[45] Date of Patent: Jul. 20, 1999

[54] CABLE TIE HAVING ENHANCED LOCKING ACTION

[75] Inventors: Soren Christian Sorensen, San Diego; Jens Ole Sorensen, Rancho Sante Fe, both of Calif.

[73] Assignee: GB Electrical, Inc., Milwaukee, Wis.

[21] Appl. No.: 08/378,809

[22] Filed: Jan. 27, 1995

[51] Int. Cl.$^6$ .................................................... B65D 63/00
[52] U.S. Cl. ...................... 24/16 PB; 24/17 A; 24/17 AP
[58] Field of Search ................. 24/16 PB, 16 R, 24/17 AP, 17 A

[56] References Cited

U.S. PATENT DOCUMENTS

| | | | |
|---|---|---|---|
| 3,537,146 | 11/1970 | Caveney | 24/16 |
| 3,924,299 | 12/1975 | McCormick | 24/16 |
| 3,965,538 | 6/1976 | Caveney et al. | 24/16 |
| 3,973,293 | 8/1976 | Noorily | 24/16 |
| 4,473,524 | 9/1984 | Paradis | 264/291 |
| 4,680,834 | 7/1987 | Andre et al. | 24/16 |

FOREIGN PATENT DOCUMENTS 1452360  10/1917  United Kingdom .

*Primary Examiner*—Peter M. Cuomo
*Assistant Examiner*—Hanh V. Tran
*Attorney, Agent, or Firm*—Edward W. Callan

[57] ABSTRACT

In a tie including an elongated tongue with a locking head at one end of the tongue, a tip at the other end of the tongue, a first set of ratchet teeth extending along one broad side of the tongue and a second set of ratchet teeth extending along the other broad side of the tongue, wherein the locking head has sides defining an opening for receiving the tip of the tongue, a movable pawl that is hinged at one side of the opening and an abutment surface that is across the opening from the pawl, wherein the pawl has pawl teeth disposed for engaging the first set of ratchet teeth, and wherein stationary teeth are disposed on the abutment surface for engaging the second set of ratchet teeth, the stationary teeth on the abutment surface have a greater lateral extension with respect to the direction of insertion of the tongue through the opening than do the pawl teeth and the second set of ratchet teeth have a greater lateral extension with respect to the direction of insertion than do the first set of ratchet teeth. Preferably, the stationary teeth on the abutment surface extend to the full width of the opening and the second set of ratchet teeth extend to the lateral edges of the tongue.

7 Claims, 1 Drawing Sheet

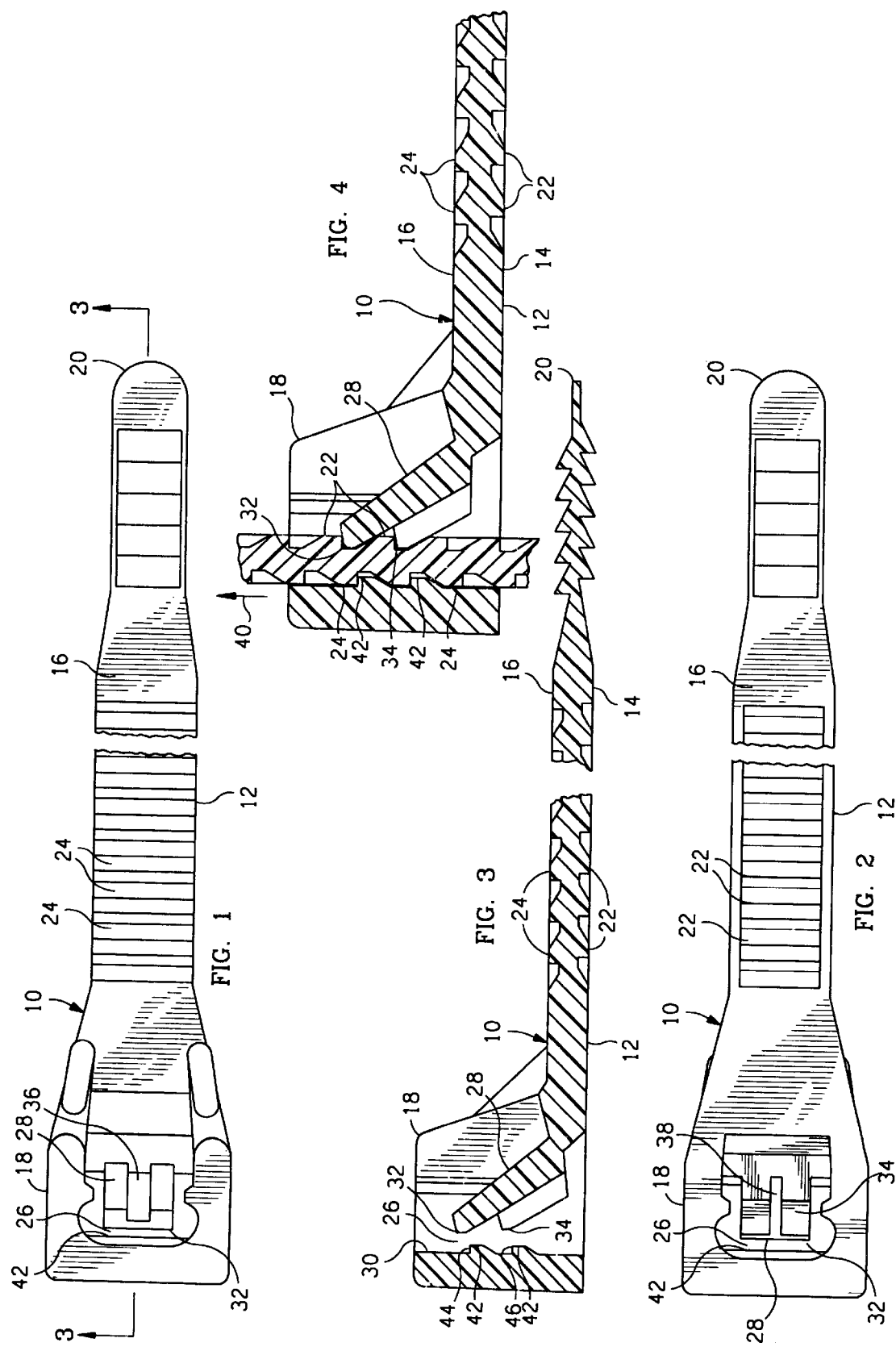

CABLE TIE HAVING ENHANCED LOCKING ACTION

BACKGROUND OF THE INVENTION

The present invention pertains to a tie that is useful for forming a loop for retaining a bundle of elongated articles, such as cables. Such a tie is commonly known as a cable tie One type of tie includes an elongated tongue with two ends and two broad sides, a locking head at one end of the tongue, a tip at the other end of the tongue, a first set of ratchet teeth extending along one broad side of the tongue and a second set of ratchet teeth extending along the other broad side of the tongue, wherein the locking head has sides defining an opening for receiving the tip of the tongue, the sides including a movable pawl that is hinged at one side of the opening and an abutment surface that is across the opening from the pawl, wherein the pawl has at least one pawl tooth disposed for engaging the first set of ratchet teeth when the tip of the tongue has been inserted through the opening with the first set of ratchet teeth facing the pawl, wherein the pawl, when the at least one pawl tooth is so engaged, is movable toward the abutment surface in response to pressure applied to the tongue in a direction opposite to the direction of insertion in order to force the second set of ratchet teeth against the abutment surface; and wherein at least one tooth is disposed on the abutment surface for engaging the second set of ratchet teeth when the tip of the tongue has been inserted through the opening with the second set of ratchet teeth facing the abutment surface and the side of the tongue including the second set of ratchet teeth is forced against the abutment surface by movement of the pawl. Such a tie is described in U.S. Pat. No. 4,473,524 to Paradis.

In another prior art tie of the typed described above, a tooth on the abutment surface has a greater lateral extension with respect to the direction of insertion than does at least one pawl tooth.

SUMMARY OF THE INVENTION

The present invention provides a tie having enhanced locking action by providing a tie as described above, wherein the at least one tooth on the abutment surface has a greater lateral extension with respect to the direction of insertion than does the at least one pawl tooth and extends to the full width of the opening and/or wherein the second set of ratchet teeth have a greater lateral extension with respect to the direction of insertion than do the first set of ratchet teeth.

Additional features of the present invention are described with reference to the detailed description of the preferred embodiments.

BRIEF DESCRIPTION OF THE DRAWING

FIG. 1 is a fragmentary top plan view of a preferred embodiment of a tie according to the present invention.

FIG. 2 is a fragmentary bottom plan view of the tie of FIG. 1.

FIG. 3 is a partial sectional view of the tie of FIG. 1 as taken along lines 3—3 in FIG. 1.

FIG. 4 is a partial sectional view illustrating the ratchet teeth on opposite sides of the tongue of the tie of FIG. 1 being engaged by the pawl teeth and the stationary teeth within the locking head.

DETAILED DESCRIPTION

Referring to the Drawing, a preferred embodiment of a tie 10 according to the present invention includes an elongated tongue 12 with two ends and two broad sides 14, 16, a locking head 18 at one end of the tongue 12, a tip 20 at the other end of the tongue 12, a first set of ratchet teeth 22 extending along one broad side 14 of the tongue 12 and a second set of ratchet teeth extending along the other broad side 16 of the tongue 12. The first set of ratchet teeth 22 may be aligned with the second set of ratchet teeth 24 (not shown) or displaced from the second set of ratchet teeth 24, as shown in the Drawing. The distance by which the first set of ratchet teeth 22 is displaced from the second set of ratchet teeth can be any percentage of the distance between adjacent ratchet teeth.

The second set of ratchet teeth 24 have a greater lateral extension with respect to the direction of insertion 40 than do the first set of ratchet teeth 22. Preferably, the second set of ratchet teeth 24 extend to the lateral edges of the tongue 12.

The locking head 18 has sides defining an opening 26 for receiving the tip 20 of the tongue 12 and thereby form a closed loop around a bundle of articles (not shown). The sides include a movable pawl 28 that is hinged at one side of opening 26 and an abutment surface 30 that is across the opening 26 from the pawl 28. The pawl 28 has a first pawl tooth 32 and a second pawl tooth 34 disposed for engaging the first set of ratchet teeth 22 when the tip 20 of the tongue 12 has been inserted through the opening 26 in the direction indicted by the arrow 40 (FIG. 4) with the first set of ratchet teeth 22 facing the pawl 28. In other embodiments, the pawl 28 may have one or more than two pawl teeth.

In the preferred embodiment, the side of the pawl 28 that does not face the abutment surface 30 includes a hollow section 36; and the second pawl tooth 34 includes a hollow section 38 parallel to but not necessarily as wide as the hollow section 36. These hollow sections are designed to prevent deformation of the first and second pawl teeth 32, 34 during injection molding, as more fully described in applicants' U.S. Pat. No. 5,263,231. Such hollow sections are not required in all embodiments.

When the pawl teeth 32, 34 are engaged with the first set of ratchet teeth 22, the pawl is movable toward the abutment surface 30 in response to pressure applied to the tongue 12 in a direction opposite to the direction of insertion 40 in order to force the second set of ratchet teeth 24 against the abutment surface 30.

There are two stationary teeth 42 disposed on the abutment surface 30. Each stationary tooth 42 has a flat surface 44 terminating in an apex 46 for engaging the second set of ratchet teeth 24 in a portion of the tongue engaged by the pawl teeth 32, 34 when the second set of ratchet teeth 24 is forced against the abutment surface 30 to thereby in combination with the two pawl teeth 32, 34 hold the tongue 12 in the locking head 18 when pressure is applied to the tongue in a direction opposite to the direction of insertion 40. In other embodiments, there may be one or more than two stationary teeth 42 disposed on the abutment surface 30.

The positions of the pawl 28 and the abutment surface 30 may be interchanged to be on opposite sides of the opening 26 from the respective positions shown in the Drawing so that the abutment surface 30 is on the side of the locking head 18 adjacent the tongue 12.

Each of the stationary teeth 42 on the abutment surface 30 has a greater lateral extension with respect to the direction of insertion 40 than do each of the pawl teeth 32, 34. Preferably, each of the stationary teeth 42 on the abutment surface 30 extends to the full width of the opening 26. In one preferred embodiment, the abutment surface 30 and the stationary teeth 42 include a notch (not shown) that is elongated in the direction of insertion 40 for the purpose of enhancing the efficiency of manufacturing the tie 10 by injection molding, as described in applicants' U.S. patent application Ser. No. 08/071,474.

Preferably, the tie 10 is manufactured by injection molding, as described in applicants' U.S. Pat. No. 5,389, 330.

The advantage specifically stated herein does not necessarily apply to every conceivable embodiment of the present invention. Further, such stated advantage of the present invention is only an exemplification and should not be construed as the only advantage of the present invention.

While the above description contains many specificities, these should not be construed as limitations on the scope of the present invention, but rather as exemplifications of the preferred embodiments described herein. Other variations are possible and the scope of the present invention should be determined not by the embodiments described herein but rather by the claims and their legal equivalents.

We claim:

1. A tie comprising an elongated tongue with two ends and two broad sides, a locking head at one end of the tongue, a tip at the other end of the tongue, a first set of ratchet teeth extending along one broad side of the tongue and a second set of ratchet teeth extending along the other broad side of the tongue, wherein the locking head has sides defining an opening for receiving the tip of the tongue, the sides including a movable pawl that is hinged at one side of the opening and an abutment surface that is across the opening from the pawl, wherein the pawl has at least one pawl tooth disposed for engaging the first set of ratchet teeth when the tip of the tongue has been inserted through the opening with the first set of ratchet teeth facing the pawl, wherein the pawl, when the at least one pawl tooth is so engaged, is movable toward the abutment surface in response to pressure applied to the tongue in a direction opposite to the direction of insertion in order to force the second set of ratchet teeth against the abutment surface, and wherein at least one tooth is disposed on the abutment surface for engaging the second set of ratchet teeth when the tip of the tongue has been inserted through the opening with the second set of ratchet teeth facing the abutment surface and the side of the tongue including the second set of ratchet teeth is forced against the abutment surface by movement of the pawl;

wherein the at least one tooth on the abutment surface has a greater lateral extension with respect to the direction of insertion than does the at least one pawl tooth and extends to the full width of the opening.

2. A tie according to claim 1, wherein the second set of ratchet teeth have a greater lateral extension with respect to the direction of insertion than do the first set of ratchet teeth.

3. A tie according to claim 2, wherein the second set of ratchet teeth extend to the lateral edges of the tongue.

4. A tie comprising an elongated tongue with two ends and two broad sides, a locking head at one end of the tongue, a tip at the other end of the tongue, a first set of ratchet teeth extending along one broad side of the tongue and a second set of ratchet teeth extending along the other broad side of the tongue, wherein the locking head has sides defining an opening for receiving the tip of the tongue, the sides including a movable pawl that is hinged at one side of the opening and an abutment surface that is across the opening from the pawl, wherein the pawl has at least one pawl tooth disposed for engaging the first set of ratchet teeth when the tip of the tongue has been inserted through the opening with the first set of ratchet teeth facing the pawl, wherein the pawl, when the at least one pawl tooth is so engaged, is movable toward the abutment surface in response to pressure applied to the tongue in a direction opposite to the direction of insertion in order to force the second set of ratchet teeth against the abutment surface; and wherein at least one tooth is disposed on the abutment surface for engaging the second set of ratchet teeth when the tip of the tongue has been inserted through the opening with the second set of ratchet teeth facing the abutment surface and the side of the tongue including the second set of ratchet teeth is forced against the abutment surface by movement of the pawl;

wherein the at least one tooth on the abutment surface has a greater lateral extension with respect to the direction of insertion than does the at least one pawl tooth; and wherein the second set of ratchet teeth have a greater lateral extension with respect to the direction of insertion than do the first set of ratchet teeth.

5. A tie comprising an elongated tongue with two ends and two broad sides, a locking head at one end of the tongue, a tip at the other end of the tongue, a first set of ratchet teeth extending along one broad side of the tongue and a second set of ratchet teeth extending along the other broad side of the tongue, wherein the locking head has sides defining an opening for receiving the tip of the tongue, the sides including a movable pawl that is hinged at one side of the opening and an abutment surface that is across the opening from the pawl, wherein the pawl has at least one pawl tooth disposed for engaging the first set of ratchet teeth when the tip of the tongue has been inserted through the opening with the first set of ratchet teeth facing the pawl, wherein the pawl, when the at least one pawl tooth is so engaged, is movable toward the abutment surface in response to pressure applied to the tongue in a direction opposite to the direction of insertion in order to force the second set of ratchet teeth against the abutment surface; and wherein at least one tooth is disposed on the abutment surface for engaging the second set of ratchet teeth when the tip of the tongue has been inserted through the opening with the second set of ratchet teeth facing the abutment surface and the side of the tongue including the second set of ratchet teeth is forced against the abutment surface by movement of the pawl;

wherein the at least one tooth on the abutment surface has a greater lateral extension with respect to the direction of insertion than does the at least one pawl tooth; and wherein the second set of ratchet teeth extend to the lateral edges of the tongue.

6. A tie comprising an elongated tongue with two ends and two broad sides, a locking head at one end of the tongue, a tip at the other end of the tongue, a first set of ratchet teeth extending along one broad side of the tongue and a second set of ratchet teeth extending along the other broad side of the tongue, wherein the locking head has sides defining an opening for receiving the tip of the tongue, the sides including a movable pawl that is hinged at one side of the opening and an abutment surface that is across the opening from the pawl, wherein the pawl has at least one pawl tooth disposed for engaging the first set of ratchet teeth when the tip of the tongue has been inserted through the opening with the first set of ratchet teeth facing the pawl, wherein the pawl, when the at least one pawl tooth is so engaged, is movable toward the abutment surface in response to pressure applied to the tongue in a direction opposite to the direction of insertion in order to force the second set of ratchet teeth against the abutment surface; and wherein at least one tooth is disposed on the abutment surface for engaging the second set of ratchet teeth when the tip of the tongue has been inserted through the opening with the second set of ratchet teeth facing the abutment surface and the side of the tongue including the second set of ratchet teeth is forced against the abutment surface by movement of the pawl;

wherein the second set of ratchet teeth have a greater lateral extension with respect to the direction of insertion than do the first set of ratchet teeth.

7. A tie according to claim 6, wherein the second set of ratchet teeth extend to the lateral edges of the tongue.

* * * * *